May 10, 1932.  W. F. STUCKEMAN  1,857,795
CUTTING TOOL
Filed July 18, 1929
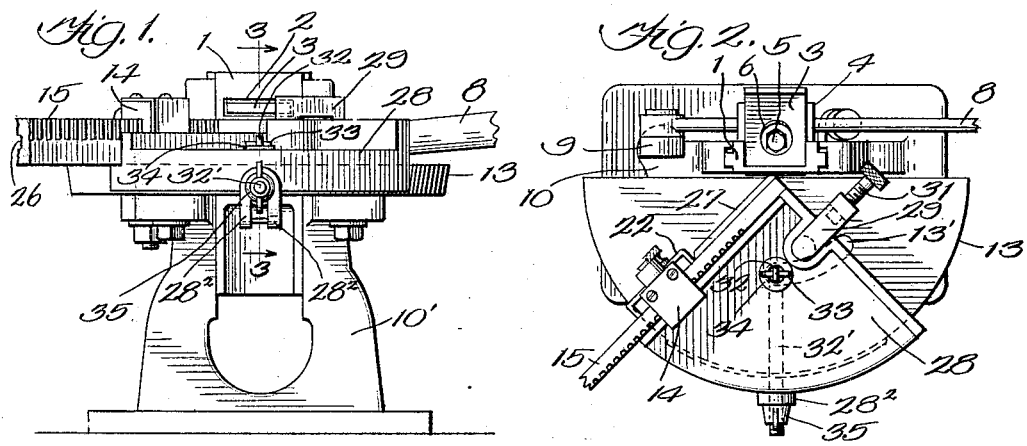
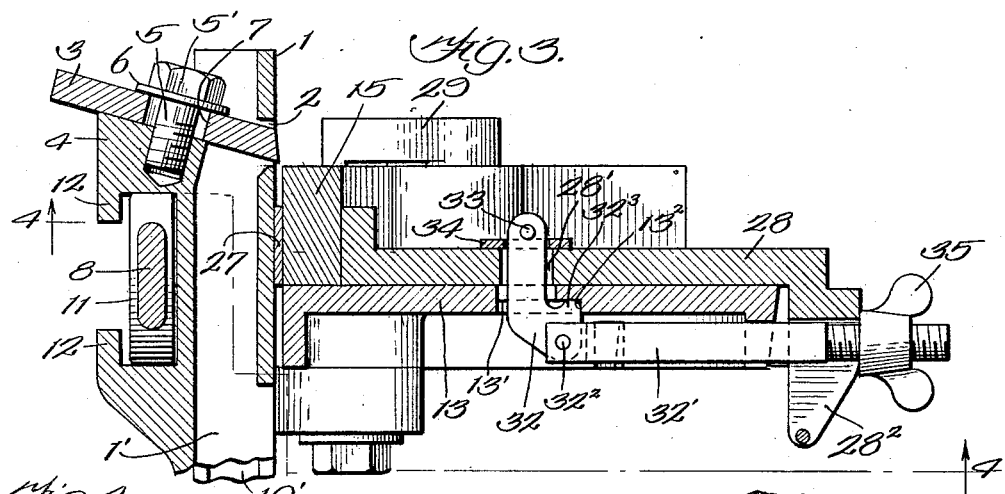
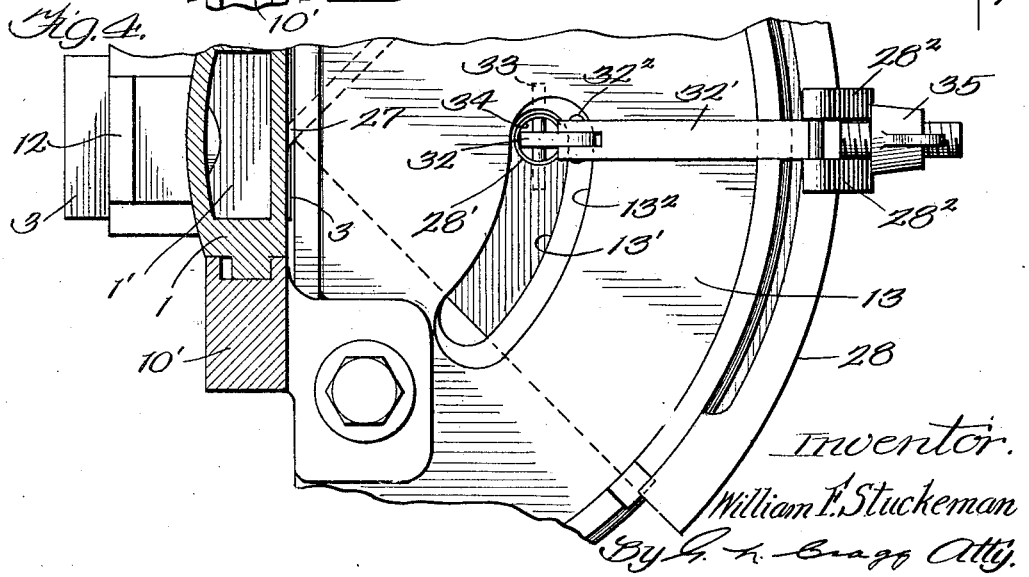
Inventor.
William F. Stuckeman Patented May 10, 1932

1,857,795

UNITED STATES PATENT OFFICE

WILLIAM F. STUCKEMAN, OF CHICAGO, ILLINOIS, ASSIGNOR TO H. B. ROUSE & COMPANY, OF CHICAGO, ILLINOIS, A CORPORATION OF ILLINOIS

CUTTING TOOL

Application filed July 18, 1929. Serial No. 379,283.

My invention relates to cutting tools and is of particular utility when employed in connection with planes for cutting printers' rules to size, though the invention is not to be limited to any particular use to which it may be put.

The present invention, in its preferred embodiment, is an improvement upon the structure disclosed in United States Patent 1,688,660, dated October 23, 1928. The structure disclosed in that patent includes a cutter, a work holding table formed with a track circularly curved upon a center adjacent the cutter, a work presenting member having sides converging toward the cutter and movable upon the table and engaging said track to be guided in its movements, a clamping bolt whose stem has two angular parts, one of these angular parts being assembled with the work presenting member and passing through a slot formed in the table and which slot extends in the direction of movement of the work presenting member, and a clamping nut threaded upon the other angular part of the bolt stem and adapted to press against the peripheral portion of the work presenting member that is between the sides of such member to hold this member in selected adjustment, said table having a formation engaging said other angular part of the bolt stem and, thereby, positioning the work presenting member with respect to the table.

My invention is preferably embodied in a structure having the aforesaid characteristics and resides in the provision of improved means whereby the work presenting member is pressed downwardly upon the table when this member is being clamped in position.

My invention, as specifically embodied, resides in forming the clamping bolt in two sections, one of the sections passing through the slot and having a lateral extension which bears upon a portion of the table that is between the work presenting member and this extension, this bolt section thus acting as a bell crank lever which forces the work presenting member downwardly upon the table when the clamping nut is turned against the side of the table.

I will explain my invention more fully by reference to the accompanying drawings in which Fig. 1 is a view in elevation with a guiding rack bar, belonging to the machine, partially illustrated; Fig. 2 is a plan view; Fig. 3 is a sectional view on line 3—3 of Fig. 1, on a larger scale; and Fig. 4 is a sectional view on line 4—4 of Fig. 3.

The cutting tool employed is preferably a shaving plane. The stock 1 of the plane is formed with a transverse slot 2 therethrough through which the cutting end of the knife or bit 3 projects beyond the bottom or sole of the stock a distance corresponding to the thickness of the shaving which is to be removed from the work. The plane bit is held in its selected adjustment against the top end 4 of the stock by means of a clamping bolt 5 whose stem is screwed into the block and whose head 5' clamps the washer 6 against the top surface of the bit to clamp the bit against the top surface of the stock end 4. The surface of the stock end 4 which is engaged by the bit is usually inclined so that the knife is presented at the proper angle to the work for cutting shavings therefrom and for directing the shavings through the slot into the hollow portion 1' of the stock. When it is desired to readjust the plane bit, said bolt is loosened, the bolt passing through an elongated slot 7 in the bit which permits longitudinal adjustment of the bit. After the bit has been suitably adjusted, the bolt is tightened to hold it in selected adjustment.

In the embodiment of the invention illustrated, the stock of the plane does not directly carry a handle, the handle 8 for operating the plane stock and the bit carried by the stock being pivotally mounted at 9 upon the ear 10 which is provided upon the pedestal 10'. The handle has an enlargement 11 which is received between the body of the stock and the shoulders 12 so that the stock may readily be moved up and down and may be pressed, during such movement, against the work which is located upon the table 13 that is carried by the pedestal 10' and is angular to the stock 1 and its plane of movement. The work is held against the leading portion of the sole of the stock, that which is in advance of the cutting edge of the bit, by means of the block 14 and the rack bar 15, fixed upon the table, said block being held in adjustable relation to the rack by any suitable means, such as that illustrated in the aforesaid patent.

The block 14 desirably carries a U-shaped member 22. The extreme ends of the sides of the U-shaped member are received in the groove 26 that is formed in the rack to hold the block 14 in exact parallelism with the rack. The work 27 being operated upon may be a printer's rule which is prevented from being projected outwardly beyond the innermost end of the U-shaped member 22 because of the reception of this end in the groove 26.

The rack 15 constitutes a portion of a quadrant 28 which is in the preferred form of work presenting member, the work engaging side of the rack constituting a work engaging side of the quadrant. The other straight work engaging side of the quadrant is provided with a clamping device which is inclusive of a bracket 29 having one side journaled in the quadrant, the other side of this bracket carrying a clamping bolt 31 which is threaded in this side, the inner end of the bolt being adapted to engage the work 27 for clamping it during trimming of one end of the work. As illustrated most clearly in Fig. 2, the quadrant is adjusted for mitering the ends of a printer's rule 27. One end of the rule is trimmed when it is held by the clamping bolt 31. After this end has been suitably trimmed, it is released from the clamp and the trimmed end thereof is positioned against the U-shaped gage stop 22. The trimming operation upon both ends of the rule are effected in the same direction from the printing edge of the rule toward the base edge, so that any burs which are formed are upon the base edge of the rule rather than upon the printing edge thereof. The quadrant may be adjusted to suit the angularity on which the trimming of the rule is to be effected. By suitably adjusting the quadrant, the rule may be trimmed at right angles to its broad faces.

The quadrant is held in selected adjustment by means of a bolt whose stem is formed in two angularly related sections 32, 32' which are in pivotal connection at 32². The bolt section 32 has an upright portion which passes through the openings 13' and 28' formed in the table 13 and work positioner, respectively. The opening 13' is an arcuate slot in the table and concentric with the arcuate outer edge of the table, while the opening 28' is preferably a circular hole in the work quadrant 28. A pin 33 passes through the upper end of the bolt section 32. A washer 34 is interposed between said pin and the member 28. The other branch of the bolt section 32 is formed with a rounded nose 32³ which bears against the underside of the table 13. A clamping wing nut 35 is screwed upon the outer end of the bolt section 32' and is engageable with the ears 28² upon the work presenting member 28, the stem section 32' of the bolt passing between these ears. The rounded nose 32³ is received in a recess in the bottom of the table 13 and engages the top or horizontal wall of this recess. A portion of the stem section 32 adjacent this nose engages a side 13² of the recess 13'. When the nut 35 is screwed in a clamping direction toward the table 13 horizontal clamping pressure is exerted against the aforesaid recess side 13². At the same time the pin 33 is pressed downwardly upon the washer 34 because of the turning effort exerted upon the stem section 32 by the stem section 32', the stem section 32 thus acting as a lever whose rounded nose 32³ has fulcrum engagement with the bottom of the table 13. The work presenting member 28 is thus both effectively clamped against rotation and firmly pressed against the top of the table 13 by the action of the single clamping element, namely, the nut 35.

Such changes may be made as fall within the scope of the following claims without departing from the invention.

Having thus described my invention, I claim:

1. The combination with a cutter; of a work holding table formed with a track circularly curved upon a center adjacent the cutter; a work presenting member having sides converging toward the cutter and movable upon the table and engaging said track to be guided in its movements; a clamping bolt whose stem has two angular parts, one of these angular parts being assembled with the work presenting member and passing through a slot formed in the table and which slots extends in the direction of movement of the work presenting member; and a clamping nut threaded upon the other angular part of the bolt stem and adapted to press against the peripheral portion of the work presenting member that is between the converging sides of said member to hold this member in selected adjustment, said table having a formation engaging the bolt stem, the angular part of the bolt stem that passes through the slot being pivotally connected with the other part of the bolt stem and in the form of a lever having fulcrum engagement with the underside of the table to draw the work presenting member downwardly upon the table when the nut is turned in a clamping direction.

2. The combination with an operating tool; of a work holding table; a work presenting member movable upon the table; a clamping bolt whose stem has two angular parts, one of these angular parts being assembled with the work presenting member and passing through a slot formed in the table and which slot extends in the direction of movement of the work presenting member; and a clamping nut threaded upon the other angular part of the bolt stem and adapted to press against the peripheral portion of the work presenting member, said table having a formation engaging the bolt stem to hold said work presenting member in selected adjustment with respect to the table, the angular part of the bolt stem that passes through the slot being pivotally connected with the other part of the bolt stem and in the form of a lever having fulcrum engagement with the underside of the table to draw the work presenting member downwardly upon the table when the nut is turned in a clamping direction.

3. The combination with an operating tool; of a member for presenting work thereto; a table upon which the work presenting member is adjustable; and a clamping device for clamping said work presenting member to said table, said clamping device including a clamping bolt whose stem has two angular parts in pivoted relationship to each other, one of said angular parts being fulcrumed against said table, and a clamping nut on said other angular part and in contact with said work presenting member, constructed and arranged whereby upon movement of said clamping nut in clamping direction said work presenting member is pressed against the table both substantially in the plane of the table and transversely of said plane.

In witness whereof, I hereunto subscribe my name.

WILLIAM F. STUCKEMAN.